L. E. OSTRANDER.
SUPPORT FOR FRUIT JARS.
APPLICATION FILED DEC. 12, 1912.
1,126,844.
Patented Feb. 2, 1915.
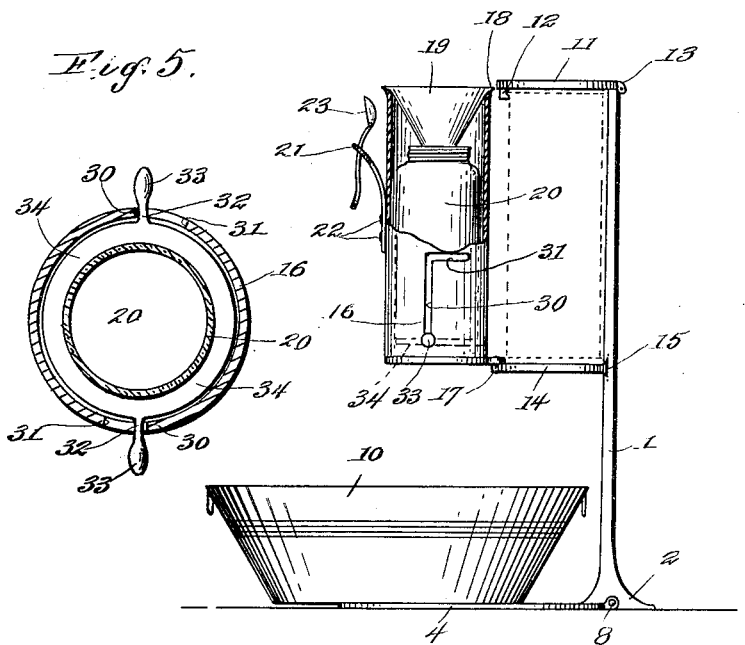
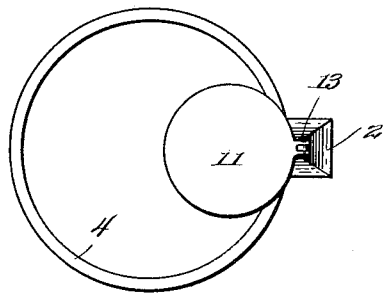
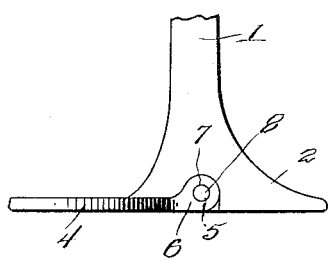
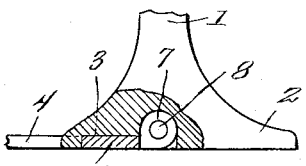
WITNESSES
INVENTOR

UNITED STATES PATENT OFFICE.

LINNIE E. OSTRANDER, OF GOLD BEACH, OREGON.

SUPPORT FOR FRUIT-JARS.

1,126,844.  Specification of Letters Patent.  Patented Feb. 2, 1915.

Application filed December 12, 1912. Serial No. 736,400.

*To all whom it may concern:*

Be it known that I, LINNIE E. OSTRANDER, a citizen of the United States, residing at Gold Beach, in the county of Curry and State of Oregon, have invented new and useful Improvements in Supports for Fruit-Jars, of which the following is a specification.

This invention relates to stands, and more specifically to a stand adapted to support a fruit jar, bottle or the like while the same is being filled.

The object of this invention is to provide a stand of this nature, simple of construction, inexpensive to manufacture, and one which may be seated on the stove, thus keeping the fruit or other substance, with which the jar or bottle is to be filled, heated.

Another object is to provide a neat, compact stand which has all conveniences, such as a funnel, spoon, and the like attached thereto and one which may be folded when not in use, thus taking up a very small space when packed away.

A still further object is the provision of a receptacle hingedly connected to the stand, which will protect the jar or bottle from exposure to the air during the time employed in filling the same, thus greatly decreasing the chances of the jar breaking.

Among the various other objects of the invention is the provision of means whereby a jar may be held vertically adjustable within the receptacle.

With the foregoing and other objects in view, the invention consists in such novel features of construction, combination, and arrangement of parts as will be hereinafter more fully described, illustrated in the accompanying drawings, and claimed.

In describing the invention in detail, reference will be had to the accompanying drawings, in which like characters designate like or corresponding parts in the several views, and in which—

Figure 1 is a side elevation of the device showing some parts in section. Fig. 2 is a top plan view. Fig. 3 is a detail view of the base end. Fig. 4 is a detail sectional view of the base of the stand showing the manner of hinging the stand and the base. Fig. 5 is a sectional view on line 5—5 of Fig. 1.

In the drawings, 1 designates the stand having an enlarged base portion 2. There is a cut-out portion 3 in the base portion 2 which is adapted to receive the ring or base proper 4 which is hingedly connected to the base portion 2, as is shown at 5. The base 4 is made of a hollow ring of metal, and has a projection 6 thereon. The projection 6 is provided with a hole 7, for the reception of the pin 8, which pin 8 is seated in a hole 9, in the base portion 2, whereby the base 4 is hingedly connected to the base portion 2. The provision of the slot 3 in the base portion 2 prevents the base 4 from bending the wrong way. This base 4 is preferably made of a hollow ring of metal so as to allow the heat from a stove (not shown) to readily and easily reach a pan 10 which is seated thereon, thus keeping the substance, with which the jars are to be filled, heated when desired, and it also provides a convenient means for hanging up the device when not in use. A member 11 having a small catch or clip 12 on the under side and near the outer edge is hinged at the top of the stand 1, as is shown at 13. A second member 14 similar in construction to the member 11 is secured at 15 to the stand 1 and has a receptacle 16 pivotally connected thereto, as is shown at 17.

The receptacle 16, which is adapted to receive a jar 20 or other receptacle which is to be filled, has its upper edges 18 flared so as to receive the funnel 19. A member 21 is securely fastened to the side of the receptacle 16 at 22 and is adapted to hold a spoon or other utensil 23 which is used in filling the jar. The pan being seated upon the base 4 keeps the stand 1 from tipping over when the jar is filled and should, by any accident, the jar be filled so full as to run over or any of the substance spill in transit from the pan to the jar, the pan will catch it, thus preventing waste.

When the device is not in use, the receptacle 16 is adapted to be folded inwardly, as is shown in dotted lines in Fig. 4, and securely held in place by the catch 12 on the member 11. The member 11 provides a covering for the receptacle 16 when the same is folded whereby dirt or any foreign articles are prevented from entering the same. Oppositely disposed slots 30 are formed vertically in the sides of the receptacle 16 and are disposed directly opposite each other. Other slots 41 extending transversely in the receptacle 16 and communicating with the upper end of the slots 30 are provided. While the slots 31 are in a parallel plane, one extends in one direction from one of the slots 30 while the other extends in the opposite direction. The slots 31 are disposed in this manner so that the flat portion 32 of the handle 33 may be moved therein when the member 34 is in a raised position. The member 34 is seated in the receptacle 16 and forms a rest for the jar 20 whereby the same may be vertically adjustable in the receptacle.

In practical fields, certain minor details of construction, combination and arrangement of parts may necessitate alterations to which the patentee is entitled, provided the alterations are comprehended within the scope of what is claimed.

Having fully described the invention, what is claimed as new is:—

1. In a device as set forth, a stand provided with an enlarged base portion, a member secured to said stand intermediate its ends, a receptacle pivoted to said member, and a plate movably mounted in said receptacle and projecting laterally therefrom, said plate capable of vertical and transverse movement within said receptacle for facilitating the removal of a jar or the like therefrom.

2. In a device as set forth, a stand having an enlarged base portion, a ring hingedly connected to said base portion, a member secured to said stand intermediate its ends, a receptacle pivotally connected to said member adapted to receive a jar or the like.

3. In a device as set forth, a stand having an enlarged base portion, a ring hingedly connected to said base portion, a member secured to said stand intermediate its ends, a receptacle pivotally connected to said member adapted to receive a jar or the like, said receptacle having its upper edges flared so as to receive a funnel.

4. In a device as set forth, a stand having an enlarged base portion, a ring hingedly connected to said base portion, a member secured to said stand intermediate its ends, a receptacle pivotally connected to said member adapted to receive a jar or the like, said receptacle having its upper edges flared so as to receive a funnel, a second member hinged to the upper end of said stand, and a catch secured to said member.

5. In a device as set forth, a stand having an enlarged base portion, a ring hingedly connected to said base portion, a member secured to said stand intermediate its ends, a receptacle pivotally connected to said member adapted to receive a jar or the like, said receptacle having its upper edges flared so as to receive a funnel, a second member hinged to the upper end of said stand, and a catch secured to said member, said base portion provided with a cut-out portion for the reception of a part of said ring whereby said ring is prevented from being bent in more than one direction.

6. In a device as set forth, a stand having an enlarged base portion, a ring hingedly connected to said base portion, a jar secured to said stand intermediate its ends, a receptacle pivotally connected to said member adapted to receive a jar or the like, said receptacle having its upper edges flared so as to receive a funnel, a second member hinged to the upper end of said stand, a catch secured to said member, said base portion provided with a cut out portion for the reception of a part of said ring whereby said ring is prevented from being bent in more than one direction and means for vertically adjusting the jar within said receptacle.

7. In a device as set forth, a stand having an enlarged base portion, a ring hingedly connected to said base portion a member secured to said stand intermediate its ends, a receptacle pivotally connected to said member adapted to receive a jar or the like, said receptacle provided with two oppositely disposed vertical slots therein, said receptacle further provided with transverse slots communicating with said first named slots, a member forming a support for a jar mounted in said receptacle, handles upon said jar, said handles projecting through said slots and forming means for vertically adjusting the jar within said receptacle.

LINNIE E. OSTRANDER.

Witnesses:
A. K. SNODGRASS,
J. W. OSTRANDER.